(12) United States Patent
Tapia

(10) Patent No.: US 6,725,807 B1
(45) Date of Patent: Apr. 27, 2004

(54) PET CANOPY

(76) Inventor: Cheryl A. Tapia, P.O. Box 6149, Big Bear Lake, CA (US) 92315

(*) Notice: Subject to any disclaimer, the term of this patent is extended or adjusted under 35 U.S.C. 154(b) by 0 days.

(21) Appl. No.: 10/335,167

(22) Filed: Dec. 31, 2002

(51) Int. Cl.[7] .................................................. A01K 1/00
(52) U.S. Cl. ........................ 119/496; 119/482; 296/98; 135/88.01
(58) Field of Search ................... 119/453, 482, 119/496, 498; 135/88.01, 88.05, 88.09, 88.13; 296/98

(56) References Cited

U.S. PATENT DOCUMENTS 5,758,921 A * 6/1998 Hall ............................ 296/98
5,924,761 A * 7/1999 Harrison ...................... 296/159
6,053,556 A * 4/2000 Webb ........................... 296/98

FOREIGN PATENT DOCUMENTS

FR        2582338 A1 * 11/1986 ........... E04H/15/06

* cited by examiner

Primary Examiner—Robert P. Swiatek

(57) ABSTRACT

The Pet Canopy of the present invention is designed to provide a convenient and compact shelter for pets kept in the bed of a pickup truck. To attain this, the present invention essentially comprises a canopy assembly having a spring-ded roll installed along the top rear width of a pickup truck cab, and a frame assembly mounted in a pickup truck bed. The canopy assembly is stretched across and fastened to the frame assembly, and is easily undone and retracted around the spring-loaded rod for stowing. The Pet Canopy of the present invention may also include side panels to provide additional protection from wind or rain.

20 Claims, 4 Drawing Sheets

PET CANOPY

BACKGROUND OF THE INVENTION

1. Field of the Invention

The present invention relates to a Pet Canopy applied over the bed of a pickup truck for use in providing shelter to pets. The Pet Canopy has particular utility in connection with providing a convenient, easy to install, versatile shelter for an animal in the bed of a pickup truck.

2. Description of the Prior Art

Pet Canopies are desirable for shading an individual's pet from hot sun, as well as providing shelter from rain or wind, when riding in the bed of a pickup truck, or while the vehicle is parked. Thus, the animal is more comfortable, and less likely to experience heat related fatigue or illness.

The use of vehicular pet shelters and enclosures is known in the prior art. For example, U.S. Pat. No. 5,065,699 to Marshall discloses a pet cage that attaches to the bed of a pickup truck. However, the structure of the Marshall '699 patent is different from that of the present invention, and has the drawback of only providing an enclosure for an animal, without the shelter provided by the pet canopy of the present invention.

U.S. Pat. No. 4,803,951 to Davis discloses an enclosure for pets as well. However, the Davis '951 patent is also structurally different from and does not provide the shelter of the present invention. The Davis '951 patent can be distinguished further by its design for use inside of a vehicle.

Similarly, U.S. Pat. No. 5,147,103 to Ducote discloses a utility cage for a pickup truck. However, like the Marshall '699 patent, the Ducote '103 patent only provides an enclosure, and does not provide the shelter or the versatility of the present invention.

Lastly, U.S. Pat. No. 5,887,932 to Pier, II, U.S. Pat. No. 1,754,610 to Clayton, and Des. 397,082 to Kunkel disclose vehicular enclosures for pets that are indicative of the current state of the art.

While the above-described devices fulfill their respective, particular objectives and requirements, the aforementioned patents do not describe a Pet Canopy that incorporates the convenience, versatility, and ease of installation of the present invention. Therefore, a need exists for a new and improved Pet Canopy that provides shelter from bright sunlight and its subsequent heat, as well as wind and rain, thereby enhancing the comfort of a pet being kept or transported in the bed of a pickup truck. In this regard, the present invention substantially fulfills this need. In addition, the Pet Canopy of the present invention could be used as a temporary cover for protecting cargo during transport, or it could provide a tent-like shelter for outdoor enthusiasts. In this respect, the Pet Canopy according to the present invention substantially departs from the conventional concepts and designs of the prior art.

SUMMARY OF THE INVENTION

In view of the foregoing disadvantages inherent in the known types of vehicular pet enclosures now present in the prior art, the present invention provides an improved Pet Canopy, and overcomes the above-mentioned disadvantages and drawbacks of the prior art. As such, the general purpose of the present invention, which will be described subsequently in greater detail, is to provide a new and improved Pet Canopy which has all the advantages of the prior art mentioned heretofore and many novel features that result in a Pet Canopy which is not anticipated, rendered obvious, suggested, or even implied by the prior art, either alone or in any combination thereof.

To attain this, the Pet Canopy of the present invention essentially comprises a canopy-style top shade panel mounted to the top rear width of a pickup truck's cab, and a lightweight frame attached to the bed of the pickup truck.

The top shade panel is affixed to a spring-loaded rod assembly, similar in design to the rod of a window shade, which is in turn fastened to the top rear width of the pickup truck's cab by mounting brackets. The exterior edge of the top shade panel is fitted with hooks or other fasteners, such as hook and pile straps.

The lightweight frame is shaped in a square "A" configuration, with an upper and a lower horizontal crossbar supported by two vertical legs. The legs are inserted through brackets mounted to the inside top rails of the pickup truck bed, and into receptacles mounted to the floor of the pickup truck bed.

To erect the Pet Canopy of the present invention, the mounting brackets are installed on both sides of the rear width of the pickup truck's cab, such that the spring loaded rod and top shade panel assembly is supported at its ends by the brackets. The aluminum frame is inserted through brackets mounted to the inside top rails of the pickup truck bed, and into receptacles mounted to the floor of the pickup truck bed. The top shade panel is pulled outward from the rod, stretched across the upper horizontal crossbar, and secured to the lower horizontal crossbar by hooks or straps, thereby providing a shade producing Pet Canopy. In an alternate configuration, the canopy is pulled outward from the rod and simply secured to the upper horizontal crossbar, allowing increased ventilation.

The Pet Canopy can also include side shade panels that can be attached to the top shade panel by zippers or other suitable fastening means, and secured to the upper rail of the pickup truck bed by snaps or other suitable fasteners. In addition, the side panels can include windows made of clear plastic, a mesh screen, or both, to provide visibility or ventilation. This alternate embodiment essentially creates a tent to provide shelter from wind and rain. In this regard, the Pet Canopy not only provides shelter for pets, but it can also be used as a tent-like shelter for camping or other outdoor activities.

When not in use, the Pet Canopy of the present invention is easily stowed by removing the side shade panels, if installed, and unhooking the top shade panel from the horizontal crossbar, allowing it to retract around the spring loaded rod. The frame can then be easily lifted out of its mounts. In this manner, the Pet Canopy can remain on the pickup truck, allowing for convenient setup, and still provide full use of the pickup truck bed.

The Pet Canopy of the present invention may be made of canvas, vinyl, plastic, textaline, or any other suitable cloth like material. The frame may be made of aluminum, wood, plastic, or any other suitably rigid, lightweight material. The Pet Canopy may also be colored to match the color of the pickup truck, and could be offered as original equipment on new pickup trucks, or as an aftermarket add on. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Pet Canopy that has all of the advantages of the prior art vehicular pet enclosures and none of the disadvantages.

It is another object of the present invention to provide a new and improved Pet Canopy that may be easily and efficiently manufactured and marketed.

An even further object of the present invention is to provide a new and improved Pet Canopy that has a low cost of manufacture with regard to both materials and labor, and which accordingly is then susceptible of low prices of sale to the consuming public, thereby making such a Pet Canopy economically available to the buying public.

Still another object of the present invention is to provide a new Pet Canopy that provides in the apparatuses and methods of the prior art some of the advantages thereof, while simultaneously overcoming some of the disadvantages normally associated therewith.

Lastly, it is an object of the present invention to provide a Pet Canopy that furnishes shade and shelter to a pet in the bed of a pickup truck, is easily installed and configured, improves safety, saves space, and allows for added convenience.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
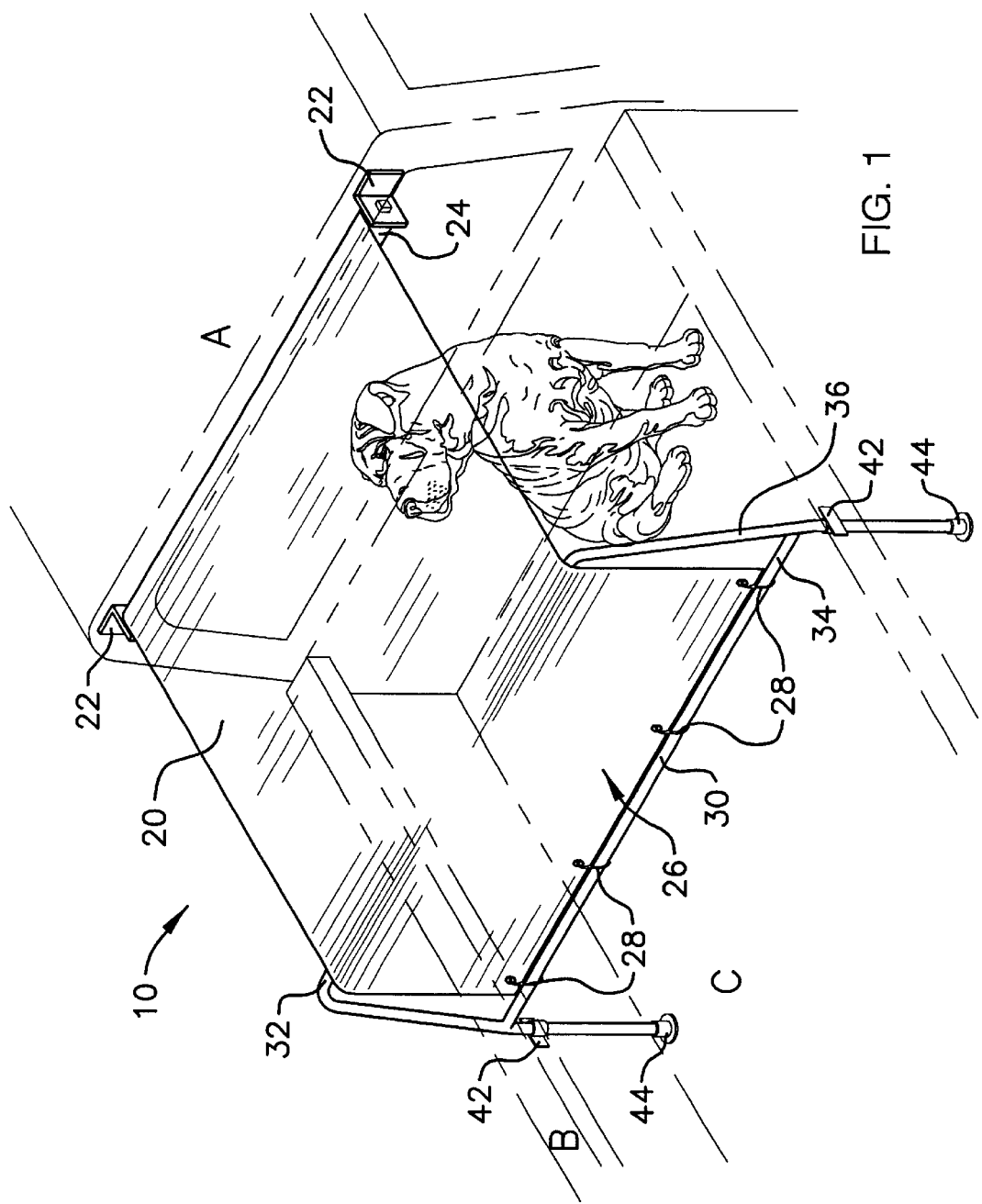
FIG. 1 is a perspective view of the preferred embodiment of the Pet Canopy constructed in accordance with the principles of the present invention in its optimal configuration.
Figure 2:
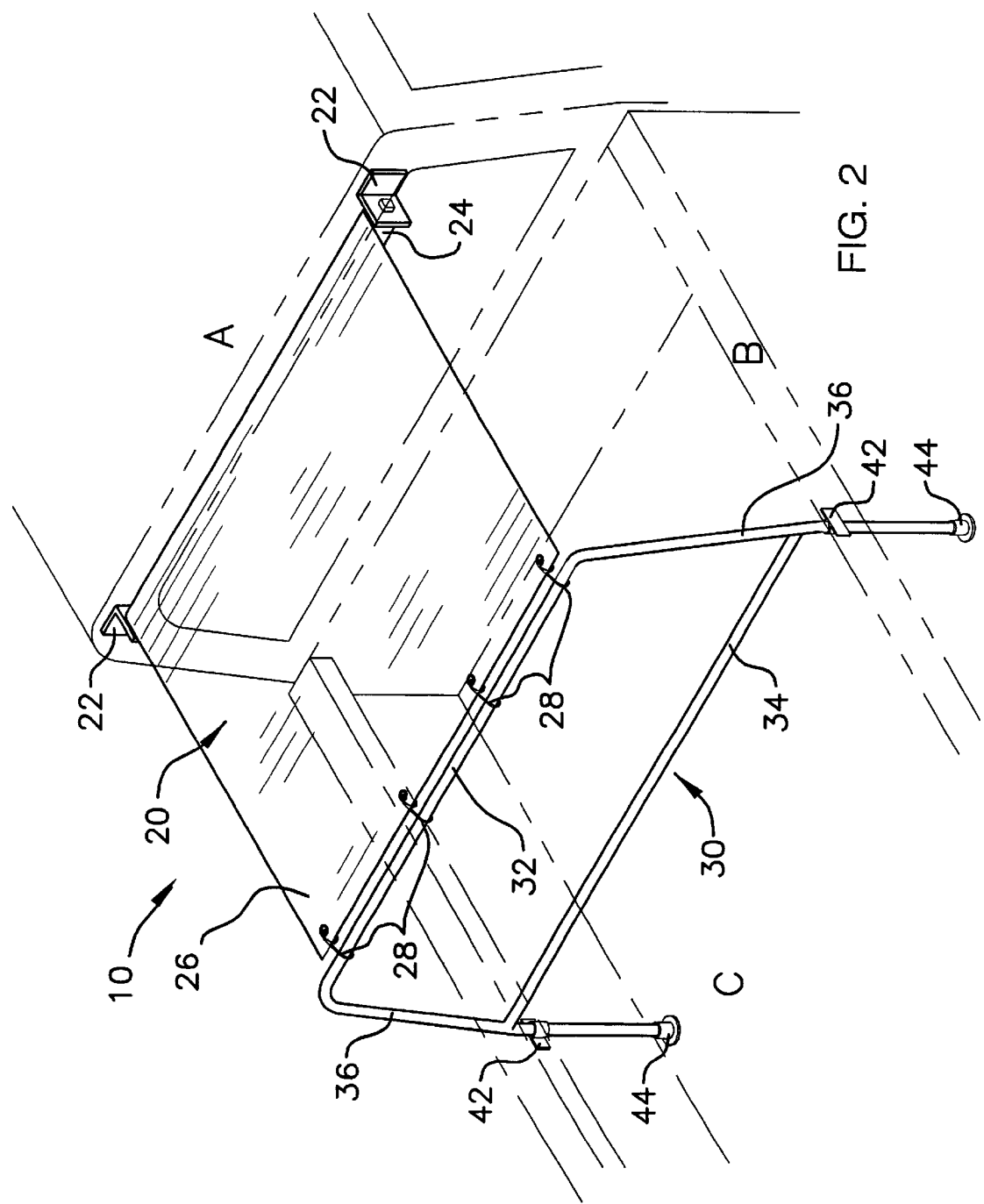
FIG. 2 is a perspective view of the preferred embodiment of the Pet Canopy of the present invention, shown in an alternate configuration.

Referring now to the drawings, and particularly to FIGS. 1 and 2, a preferred embodiment of the Pet Canopy of the present invention is shown and generally designated by the reference numeral 10.

In FIG. 1, a new and improved Pet Canopy 10 of the present invention for providing shade and shelter to pets in the bed of a pickup truck is illustrated and will be described. The Pet Canopy 10 comprises a canopy assembly 20 and a frame assembly 30. Canopy assembly 20 is mounted to the top rear width A of the pickup truck cab by cab brackets 22, and further comprises spring-loaded rod 24, top shade panel 26, and a plurality of canopy fasteners 28.

Frame assembly 30 is formed in the shape of a square "A," and further comprises upper horizontal crossbar 32, lower horizontal crossbar 34, and vertical legs 36. Frame assembly 30 can be of one-piece construction, or alternatively, upper horizontal crossbar 32 and lower horizontal crossbar 34 may be removably attached to vertical legs 36. Vertical legs 36 are inserted through bed brackets 42, which are mounted to the inside top side rails B of the pickup truck bed, and inserted into bed receptacles 44, which are mounted to the floor C of the pickup truck bed.

Shade panel 26 is drawn from spring-loaded rod 24, stretched across upper horizontal crossbar 32, and secured to lower horizontal crossbar 34 with canopy fasteners 28.

Similarly, FIG. 2, illustrates the Pet Canopy 10, comprising a canopy assembly 20, which is mounted to the top rear width A of the pickup truck cab by cab brackets 22 and further comprises spring-loaded rod 24, shade panel 26, and fasteners 28. Pet Canopy 10 additionally comprises frame assembly 30, which is formed in the shape of a square "A," and further comprises upper horizontal crossbar 32, lower horizontal crossbar 34, and vertical legs 36. Frame assembly 30 can be of one-piece construction, or alternatively, upper horizontal crossbar 32 and lower horizontal crossbar 34 may be removably attached to vertical legs 36. Vertical legs 36 are inserted through bed brackets 42, which are mounted to the inside top side rails B of the pickup truck bed, and inserted into bed receptacles 44, which are mounted to the floor C of the pickup truck bed. In this configuration, shade panel 26 is drawn from spring-loaded rod 24, and secured to upper horizontal crossbar 32 with canopy fasteners 28.

Figure 3:
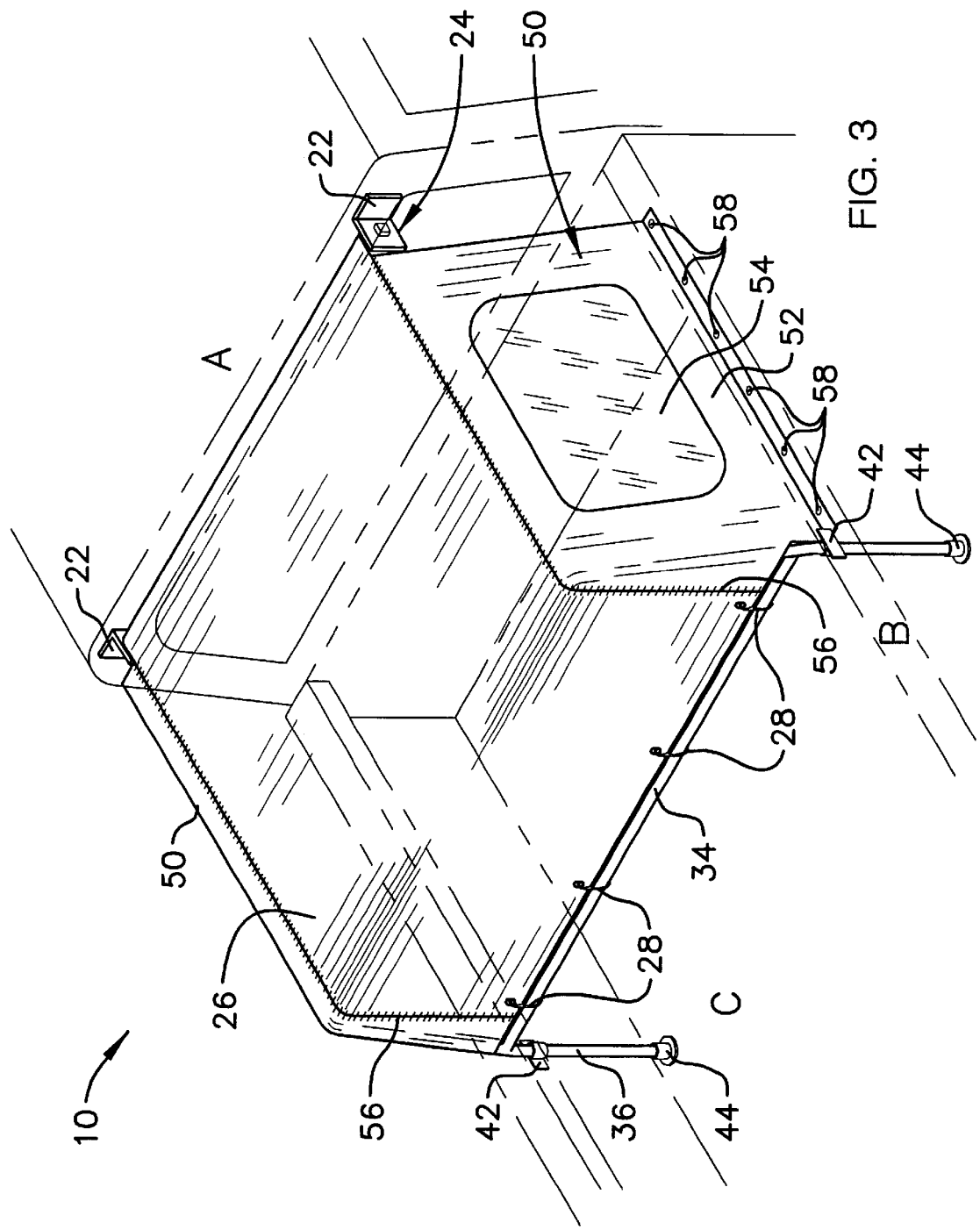
FIG. 3 is a perspective view of an alternate embodiment of the Pet Canopy of the present invention, showing the zippered side panels.

Referring now to FIG. 3, an alternate embodiment of the Pet Canopy 10 is illustrated. In addition to comprising a canopy assembly 20 and a frame assembly 30, this embodiment further comprises side panels 50.

Canopy assembly 20 is mounted to the top rear width A of the pickup truck cab by cab brackets 22, and further comprises spring-loaded rod 24, shade panel 26, and canopy fasteners 28. Frame assembly 30 is formed in the shape of a square "A," and further comprises upper horizontal crossbar 32, lower horizontal crossbar 34, and vertical legs 36.

Frame assembly 30 can be of one-piece construction, or alternatively, upper horizontal crossbar 32 and lower horizontal crossbar 34 may be removably attached to vertical legs 36. Vertical legs 36 are inserted through bed brackets 42, which are mounted to the inside top side rails B of the pickup truck bed, and inserted into bed receptacles 44, which are mounted to the floor C of the pickup truck bed.

Side panels 50 further comprise a left shade panel 52a, and a right shade panel 52b, each having a window panel 54. Side shade panels 52a and 52b are removably attached to top shade panel 26 by zippers 56, and are secured to the top side rails B of the pickup truck bed by a plurality of side panel fasteners 58.

Figure 4:
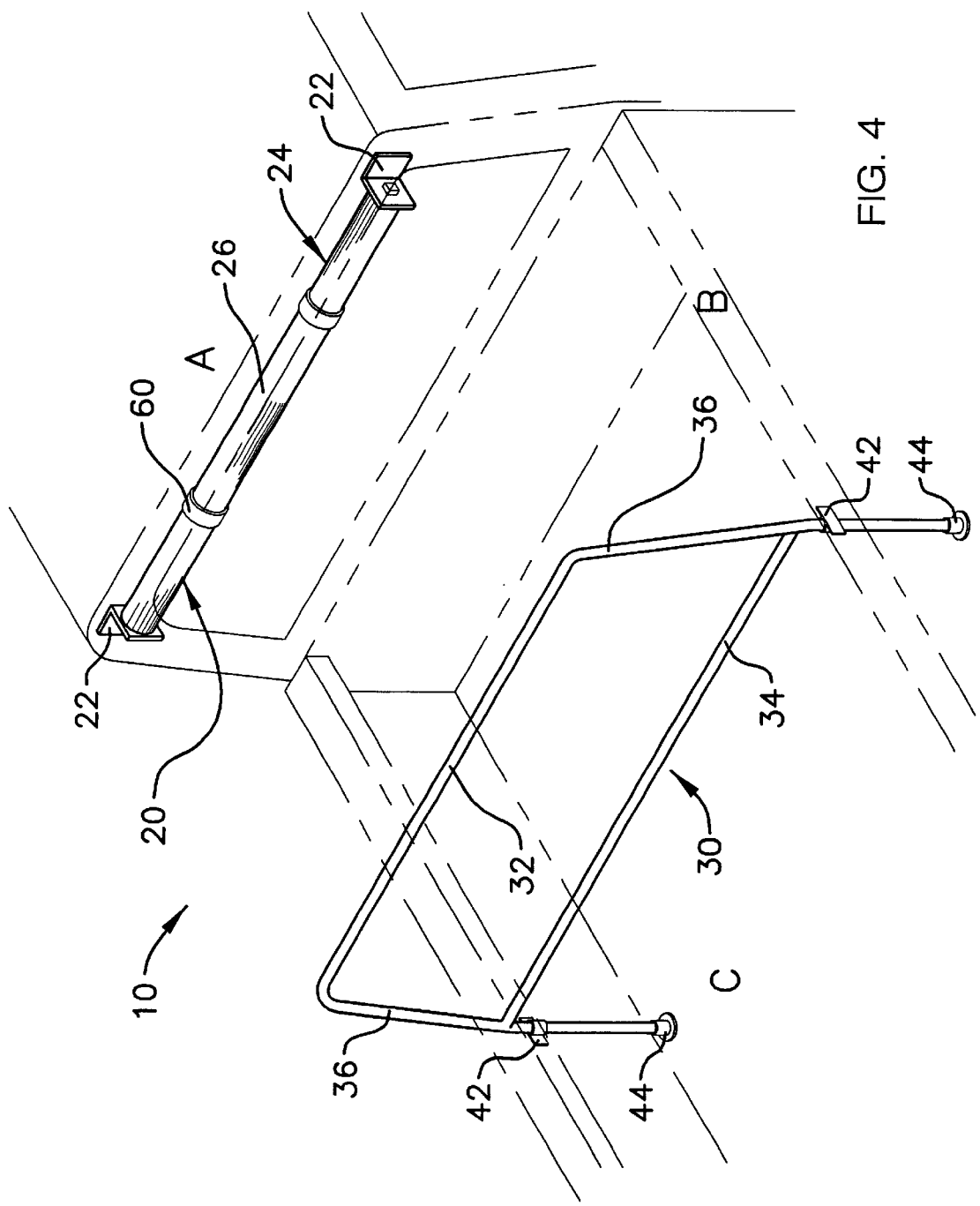
FIG. 4 is a perspective view of the Pet Canopy of the present invention in its stowed configuration.

Referring now to FIG. 4, Pet Canopy 10 of the present invention, comprising canopy assembly 20 and frame assembly 30, is shown in the stowed configuration. In this configuration, canopy assembly 20, further comprising spring-loaded rod 24, top shade panel 26, and securing straps 60, is mounted to the top rear width A of the pickup truck cab by cab brackets 22. Shade panel 26 is retracted around spring-loaded rod 24, and secured in place with securing straps 60.

Frame assembly 30, formed in the shape of a square "A," further comprises upper horizontal crossbar 32, lower horizontal crossbar 34, and vertical legs 36. Frame assembly 30 can be of one-piece construction, or alternatively, upper horizontal crossbar 32 and lower horizontal crossbar 34 may be removably attached to vertical legs 36. Vertical legs 36 are inserted through bed brackets 42, which are mounted to the inside top side rails B of the pickup truck bed, and inserted into bed receptacles 44, which are mounted to the floor C of the pickup truck bed.

In use, it can now be understood that the Pet Canopy 10 of the current invention can be configured as a simple awning or shade, as illustrated in FIGS. 1 and 2. The configuration illustrated in FIG. 1 provides optimal shade and shelter, whereas the configuration illustrated in FIG. 2 can be used when additional ventilation is desired. Alternatively, the Pet Canopy 10 of the present invention is easily adapted to form a tent or shelter, as illustrated in FIG. 3. Either embodiment is easily and compactly stowed, as illustrated in FIG. 4.

While a preferred embodiment of the Pet Canopy has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable cloth-like material such as canvas, vinyl, plastic, or textaline may be used in the panel assemblies. Similarly, the frame may be constructed of aluminum, wood, plastic, or any other suitably rigid, lightweight material. Also, the fasteners may be hooks, snaps, hook and loop straps, or any other fastener that allows easy engagement. And although a shelter for an animal in the bed of a pickup truck has been described, it should be appreciated that the Pet Canopy herein described is also suitable for any purpose where a convenient, easy to install, versatile covering for a pickup truck bed is desired.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet canopy for use on pickup trucks comprising a canopy assembly and a frame assembly, wherein:
   said canopy assembly further comprises a spring loaded rod and a top shade panel, said shade panel being attached to and rolled around said spring loaded rod;
   said frame assembly further comprises an upper and a lower horizontal crossbar, said crossbars being supported at their ends by two vertical legs;
   said spring-loaded rod is mounted to the top rear width of a pickup truck cab by brackets; and
   said vertical legs are inserted through brackets mounted to the inside top side rails of a pickup truck bed and into receptacles mounted to the floor of said pickup truck bed.

2. The pet canopy of claim 1, wherein said top shade panel has a free end and an attached end.

3. The pet canopy of claim 2, wherein said attached end is fixedly attached to said spring-loaded rod, and said free end is fitted with a plurality of canopy fasteners, such that said top shade panel can be unrolled from said spring-loaded rod, stretched across said upper horizontal crossbar, and removably attached to said lower crossbar with said canopy fasteners.

4. The pet canopy of claim 3, wherein said canopy fasteners are hooks.

5. The pet canopy of claim 3, wherein said canopy fasteners are hook and pile straps.

6. The pet canopy of claim 3, wherein said top shade panel is a solid, opaque material.

7. The pet canopy of claim 3, wherein said top shade panel is a mesh material woven from threads having a water-resistant coating.

8. The pet canopy of claim 3, wherein said frame assembly is lightweight metal.

9. The pet canopy of claim 3, wherein said frame assembly is plastic.

10. The pet canopy of claim 3, wherein said upper horizontal crossbar and said lower horizontal crossbar are removably attached to said vertical legs.

11. A pet canopy for use on pickup trucks comprising a canopy assembly and a frame assembly, wherein:
    said canopy assembly further comprises a spring loaded rod and a top shade panel, said shade panel being attached to and rolled around said spring loaded rod;
    said frame assembly further comprises an upper and a lower horizontal crossbar, said crossbars being supported at their ends by two vertical legs;
    said spring-loaded rod is mounted to the top rear width of a pickup truck cab by brackets;
    said vertical legs are inserted through brackets mounted to the inside top side rails of a pickup truck bed and into receptacles mounted to the floor of said pickup truck bed;
    said top shade panel is rectangular in shape and has a free end and an attached end;
    said attached end is fixedly attached to said spring-loaded rod, with a plurality of canopy fasteners fitted to said free end, such that said top shade panel can be unrolled from said spring-loaded rod, stretched across said upper horizontal crossbar, and removably attached to said lower crossbar with said canopy fasteners; and said canopy assembly further comprises a right and a left side shade panel.

12. The pet canopy of claim 11, wherein said left and right shade panels are removably attached to said top shade panel with zippers, and removably attached to the top rails of a pickup truck bed by side panel fasteners.

13. The pet canopy of claim 12, wherein said side panel fasteners are snaps.

14. The pet canopy of claim 12, wherein said left and right shade panels further comprise a window panel.

15. The pet canopy of claim 14, wherein said window panels are a solid, transparent material.

16. The pet canopy of claim 14, wherein said window panels are mesh screens.

17. The pet canopy of claim 14, wherein said top shade panel and said left and right side panels are a mesh material woven from threads having a water-resistant coating.

18. The pet canopy of claim 17, wherein said frame assembly is plastic.

19. The pet canopy of claim 17, wherein said frame assembly is lightweight metal.

20. A pet canopy for use on pickup trucks comprising a canopy assembly and a frame assembly, wherein:

said canopy assembly further comprises a spring loaded rod and a top shade panel, said shade panel being attached to and rolled around said spring loaded rod;

said frame assembly further comprises an upper and a lower horizontal crossbar, said crossbars being removably attached at their ends to two vertical legs;

said spring-loaded rod is mounted to the top rear width of a pickup truck cab by brackets;

said vertical legs are inserted through brackets mounted to the inside top side rails of a pickup truck bed and into receptacles mounted to the floor of said pickup truck bed;

said top shade panel is rectangular in shape and has a free end and an attached end;

said attached end is fixedly attached to said spring-loaded rod, with a plurality of canopy fasteners fitted to said free end, such that said top shade panel can be unrolled from said spring-loaded rod, stretched across said upper horizontal crossbar, and removably attached to said lower crossbar with said canopy fasteners; and said canopy assembly further comprises a right and a left side shade panel, wherein said left and right shade panels are removably attached to said top shade panel with zippers, and removably attached to the top rails of a pickup truck bed by snaps;

said left and right shade panels further comprise a window panel;

said top shade panel and said left and right side panels are a solid, opaque material; and said window panels are a solid, transparent material.

* * * * *